United States Patent [19]

Hendry et al.

[11] Patent Number: 4,461,619
[45] Date of Patent: Jul. 24, 1984

[54] METHOD OF PREDICTING BIOLOGICAL ACTIVITY OF COMPOUNDS BY NUCLEIC ACID MODELS

[75] Inventors: Lawrence B. Hendry, North Augusta; Edwin D. Bransome, Jr., Aiken, both of S.C.; Marion S. Hutson, Augusta; Lillian K. Campbell, Atlanta, both of Ga.

[73] Assignee: Medical College of Georgia Research Inst., Augusta, Ga.

[21] Appl. No.: 477,017

[22] Filed: Mar. 21, 1983

Related U.S. Application Data

[63] Continuation-in-part of Ser. No. 335,589, Dec. 29, 1981, abandoned.

[51] Int. Cl.³ .............................................. G09B 23/26
[52] U.S. Cl. .................................. 434/295; 434/275; 435/172.1
[58] Field of Search ................ 434/279, 278, 280, 285

[56] References Cited

U.S. PATENT DOCUMENTS

| | | | |
|---|---|---|---|
| 3,296,714 | 1/1967 | Klotz | 434/279 |
| 3,445,940 | 5/1969 | Dziulak | 434/279 |
| 3,594,924 | 7/1971 | Baker | 434/279 |
| 3,802,097 | 4/1974 | Gluck | 434/279 |
| 4,031,635 | 6/1977 | Brandt et al. | 434/295 |
| 4,184,271 | 1/1980 | Barnett, Jr. | 434/279 |

Primary Examiner—William H. Grieb
Attorney, Agent, or Firm—William H. Needle

[57] ABSTRACT

A method for determining the relationship of chemical structure to biological activity based on the topology and physiochemical properties of "cavities" or "artificial constructs" constructed from molecular models of nucleic acids, including, double-stranded DNA, double-stranded RNA and double-stranded DNA-RNA complexes. With DNA models, the second codon base is removed from each of the sixty-four possible codon-anticodon complexes in the configuration of DNA to form the cavities. Cavities were also formed between the base pairs of partially uncoiled DNA. Using the conventional physiochemical principles of hydrogen bonding and steric constraints, molecules having varying types of biological activity will fit stereochemically into certain cavities while, conversely, molecules which do not form complementary fits into a given cavity will not possess the respective biological activity. Also, the method can be utilized to determine the degree of biological activity of compounds.

8 Claims, 11 Drawing Figures

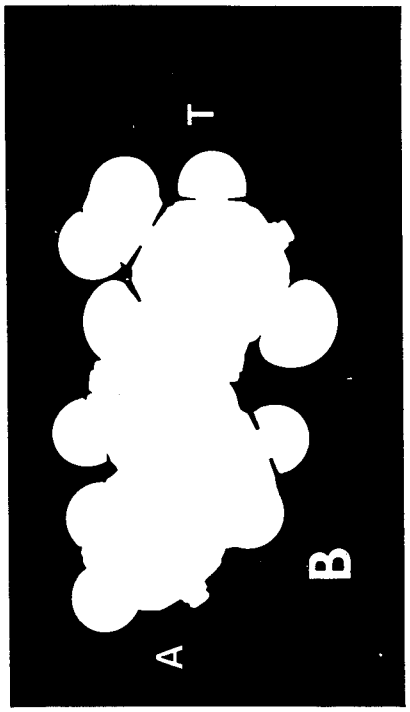
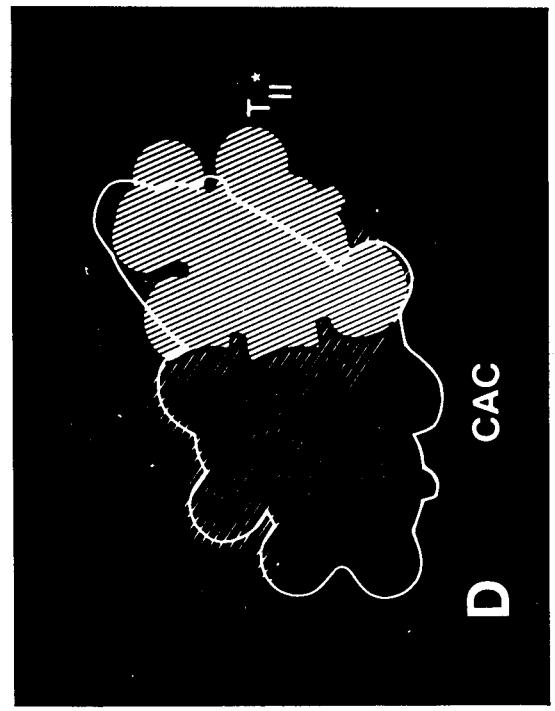
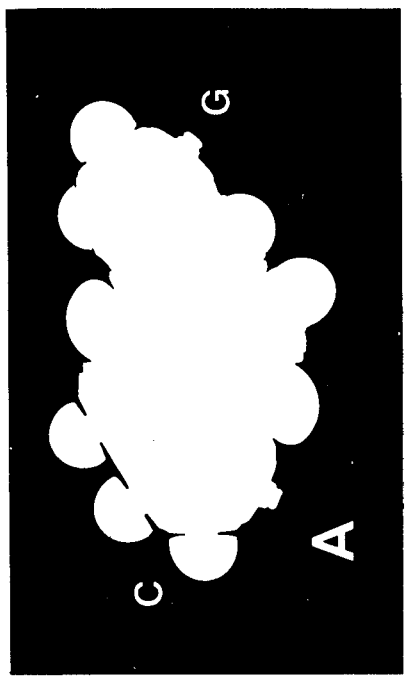
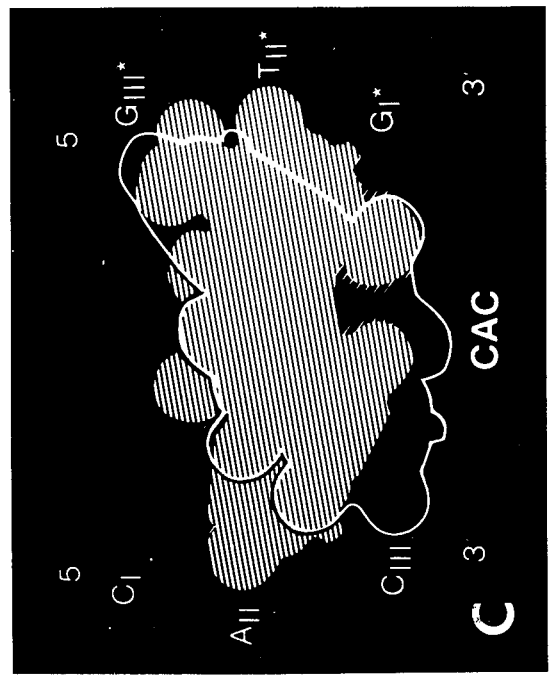
FIG. 3

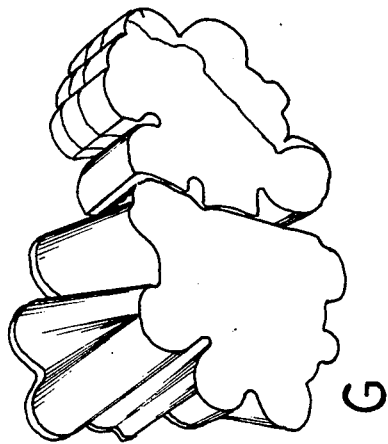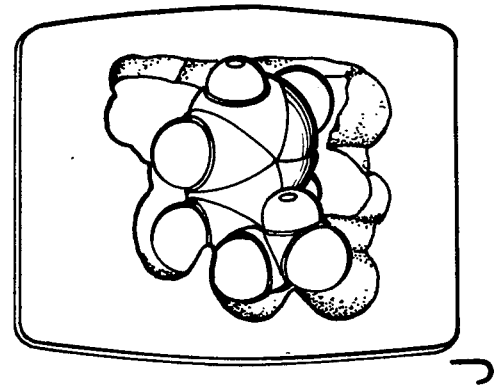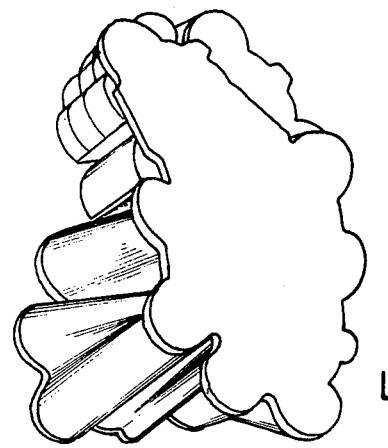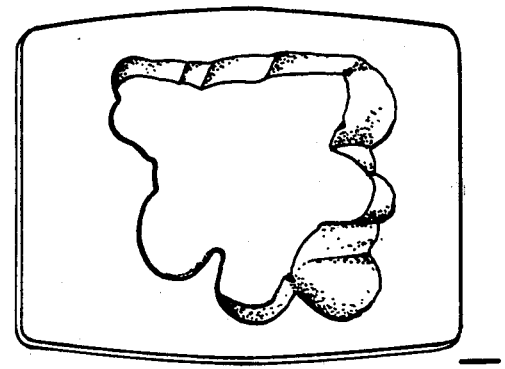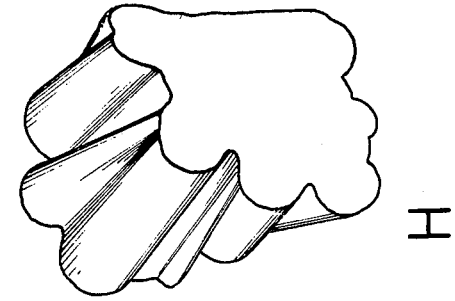
FIG 3

The complementary hydrogen bond pairing of L-amino acid R groups and adjacent nucleic acid bases permitted in DNA "cavities".

| Amino Acid | Adjacent base* | R Group-Base interaction |
|---|---|---|
| Arginine | <u>C</u> | $-NH\cdots N_3(C); -NH\cdots O_2(C)$ |
| Aspartic Acid | <u>T</u> | $COO^{\ominus} \cdots HN_3(T)$ |
| Asparagine | <u>T</u> | $-CO\cdots HN_3(T); -NH\cdots O_4(T)$ |
| Cysteine | <u>C</u> | $-S-H\cdots N_3(C)$ |
| Glutamic Acid | <u>T</u> | $COO^{\ominus} \cdots HN_3(T)$ |
| Glutamine | <u>T</u> | $-CO\cdots HN_3(T); -NH\cdots O_4(T)$ |
| Histidine | <u>T</u> | $-N\cdots HN_3(T)$ |
| Lysine | <u>T</u>, C | $-NH_3^{\oplus}\cdots O_4(T); NH_3^{\oplus}\cdots O_2(C)$ |
| Serine | <u>C</u>, <u>G</u> | $-OH\cdots N_3(C); H_2O\cdots HN_1(G)$ |
| Threonine | C, <u>G</u> | $-OH\cdots N_3(C); H_2O\cdots HN_1(G)$ |
| Tryptophan | <u>C</u> | $N-H\cdots N_3(C)$ |
| Tyrosine | <u>T</u> | $-OH\cdots O_4(T)$ |

\* underlined bases are the second bases in the anticodons for the amino acid listed.

FIG 5

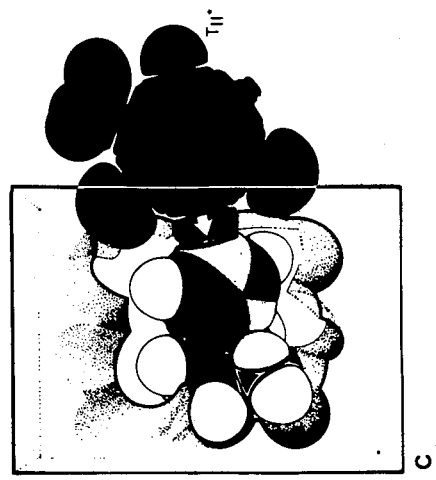
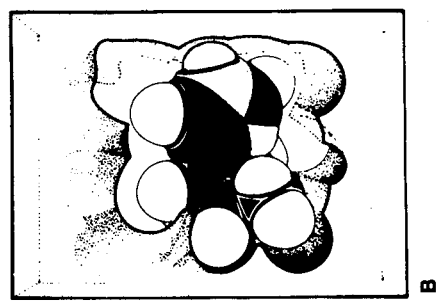
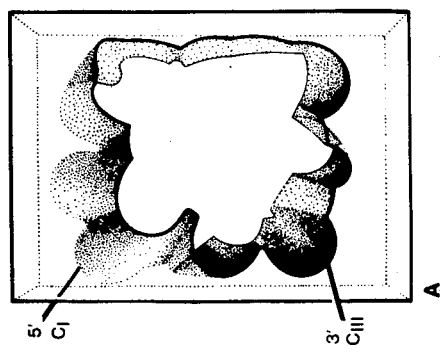
FIG 6

METHOD OF PREDICTING BIOLOGICAL ACTIVITY OF COMPOUNDS BY NUCLEIC ACID MODELS

CROSS-REFERENCE TO RELATED APPLICATION

This is a continuation-in-part application of the copending prior application of Lawrence B. Hendry, et al., Ser. No. 335,589, filed Dec. 29, 1981 entitled "Method of Predicting Biological Activity of Compounds by DNA Models", now expressly abandoned as of the filing date granted this application.

BACKGROUND OF THE INVENTION

1. Field of the Invention

This invention relates generally to the determination of the biological function of molecules and, more specifically, to a method of predicting the biological activity of compounds using models of nucleic acids, including DNA, RNA and DNA-RNA complexes.

2. Description of the Prior Art

DNA (deoxyribonucleic acid) is a repeating polymeric structure which has two primary components: a deoxyribosephosphate backbone and a series of nucleic acid bases stacked in a helical pattern. The DNA molecular contains the genetic code that is generally recognized as a universal language used in all living systems and is divided into triplet sections, each section formed from a sequence of three (3) bases of nucleic acids and each section influencing the coding for a specific amino acid. In double-stranded nucleic acids, the bases are paired, giving rise to a coiled, double helical structure.

Twenty years have passed since the discovery of the genetic code. The exact naure of the relationship between the sequences of three consecutive nucleotide bases known as codons and the unique group of twenty L-amino acids involved in protein synthesis is, however, still uncertain. While there have been many descriptions of physicochemical relationships between amino acids and the purine and pyrimidine moieties of their codons, a satisfactory stereochemical explanation of the code remains to be established. Thus, how each of the amino acids in a protein sequence came to be related to three (3) nucleic acid bases in a nucleic acid sequence has not been elucidated. This state of affaris prompted Crick to propose that the code might be a "frozen accident" of the evolutionary process while nonetheless advising that "it is therefore essential to pursue the stereochemical theory." Crick, F. H. (1968), *J. Mol. Biol.*, vol. 38, pages 367–379.

In the search for various stereochemical approaches to the genetic code, e.g., Hendry, L. B., et al., (1979), *Persp. Biol. Med.*, vol. 22, pages 333–345. it was discovered that many of the R groups of the twenty L-amino acids are similar in structure to the purine (adenine and guanine) and pyrimidine (thymine and cytosine) bases of DNA. (FIG. 1A). When the $\alpha$-amino group of an amino acid is positioned at N-9 of a purine of N-1 of a pyrimidine as shown in FIG. 1B, the R group can assume a conformation in which the atomic arrangements are like those of a purine or a pyrimidine is a complementary Watson-Crick base pair. Amino acids with hydrophilic moieties appear to be capable of forming complementary hydrogen bonding pairs with nucleic acid bases which are analogous to those in base pairs. Hydrophobic amino acids can, in many caases, form complementary Van der Waals surfaces with one of the bases (FIG. 1B). The complementary of Watson-Crick nucleic acid base pairs and the putative complementary pairing of structurally analogous amino acids with bases are illustrated in A-F of FIG. 1B: (A) cytosine(C)-guanine(G) base pair; (B) cytosine-arginine(ARG) pair; (C) proline(PRO)-guanine pair; (D) thymine(T)-adenine(A) pair; (E) thymine-histidine(HIS) pair; and (F) isoleucine(ILE)-adenine pair. With fourteen of the twenty L-amino acids, only one complementary amino acid-base pair is possible; in each case, the base is the second in its anticodon.

The above-described structural analogies between L-amino acids and nucleic acid bases suggested that it might be possible to employ modelling techniques to incorporate amino acids directly into DNA as if they were bases with apparent stereochemical specificity and without disrupting the double helix configuration.

SUMMARY OF THE INVENTION

The invention described herein is a new method for, among other things, predicting the biological activity (as drugs, toxins, growth regulators, etc.) of molecules, as well as the degree of biological activity of such compounds. The term "biological activity" means the stimulation or inhibition of cellular physiology as in the interference with the pathophysiology of disease, including neoplasia, or carcinogenic, teratologic or other cytotoxic effects. Conventional methods already exist for predicting activity based on the existing structures or molecules of known biological activity. The present method is based on the concept that the structures and the related physiochemical properties of all biologically active molecules are reflected in the structure of the genetic template, DNA. This concept seems reasonable in light of the established hypothesis that the genetic information of the production and chemoreception of all naturally occurring biologically active molecules is in DNA. In other words, there must be a "blueprint" in DNA for the production and biological function of all natural products.

A novel set of "artificial constructs" have been developed which are based in part upon the structure of DNA, RNA, and/or DNA-RNA complexes. The "artificial constructs" have no known existence in nature but provide means for a topological and physiochemical understanding of the "blueprint" for biological activity and function. The "blueprint" can be viewed in three dimensions as a series of lock and key fits of molecules into the "artificial constructs".

In essence, the double stranded helical structure of DNA has been used to construct cavities which reflect either artificial spaces created by removing a single base from the helix or artificial spaces created between base pairs upon uncoiling the helix. Thus, depending upon which nucleotides are in a given base sequence in DNA, several unique "artificial constructs" of these cavities can be made which have different shapes, sizes and physiochemical properties. The "artificial constructs" are descriptions of the properties of configurations in DNA which are not known to exist in nature.

Molecules having varying types of biological activity will fit in a stereochemically complementary fashion into certain of the "artificial constructs." The structures of molecules with similar activity can be correlated with their fits while, conversely, molecules which do not form complementary fits into a given cavity will not possess the respective biological activity.

The potential scope of the present invention involves predictions of biological activity for: (1) naturally occurring molecules whose structures are known; and (2) non-naturally occurring molecules that have been synthesized. It is also possible to use the method to conceive of the structures and predict the activities of: (1) new synthetic molecules; (2) metabolites of new synthetic molecules; (3) natural products whose structures have not yet been elucidated; and (4) structures of metabolites of natural products whose structures have not been elucidated. Examples of the types of molecules whose activities can be predicted are:

| peptide hormones | androgens | carcinogens |
| neurotransmitters | estrogens | teratogens |
| adrenergics | glucocorticoids | ionophores |
| plant hormones | cholecalciferols | neuroleptics |
| pheromones | vitamins | herbicides |
| histamines | anticonvulsants | insecticides |
| antihistamines | antibiotics | chemical warfare agents |
| antiestrogens | sedatives and hypnotics | |

When the present invention is uses to predict the degree of biological activity of compounds (natural or synthetic), the compounds are fitted into the cavities formed from unwinding the nucleic acid and ranked according to their fit and complementary hydrogen bonding.

DESCRIPTION OF THE FIGURES OF THE DRAWINGS

FIG. 3 illustrates the construction of "cavities" in DNA;

FIG. 5 sets forth the complementary hydrogen bond pairing of amino acid R groups and adjacent nucleic acid bases permitted in DNA "cavities";

FIG. 6 is an illustration of the fit of L-histidine into the cavity formed from one of its codons (CAC)

DETAILED DESCRIPTION OF THE ILLUSTRATIVE EMBODIMENTS

I. "Artificial Constructs" of Stereochemical Complementary "Cavities" Made by Removal of a Base in DNA

A. Theory of "Cavities"

Using Corey-Pauling-Koltun (CPK) space-filling molecular models, Kendrew models and the National Institute of Health (NIH) X-ray computer graphics system, it was found that amino acids could be incorporated with apparent stereochemical specificity into DNA without disrupting the double helix. This was especially evident when the amino acids were placed in cavities created by removal of the second base of their codons and were thus paired with the adjacent second base of their anticodons (see FIG. 2).

Figure 1A:
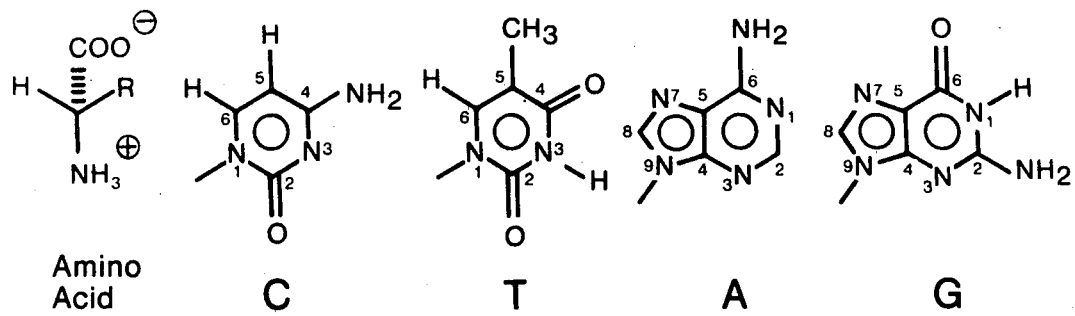
FIGS. 1A and B are structural analogies between L-amino acids and nucleic acid bases.
Figure 1B:
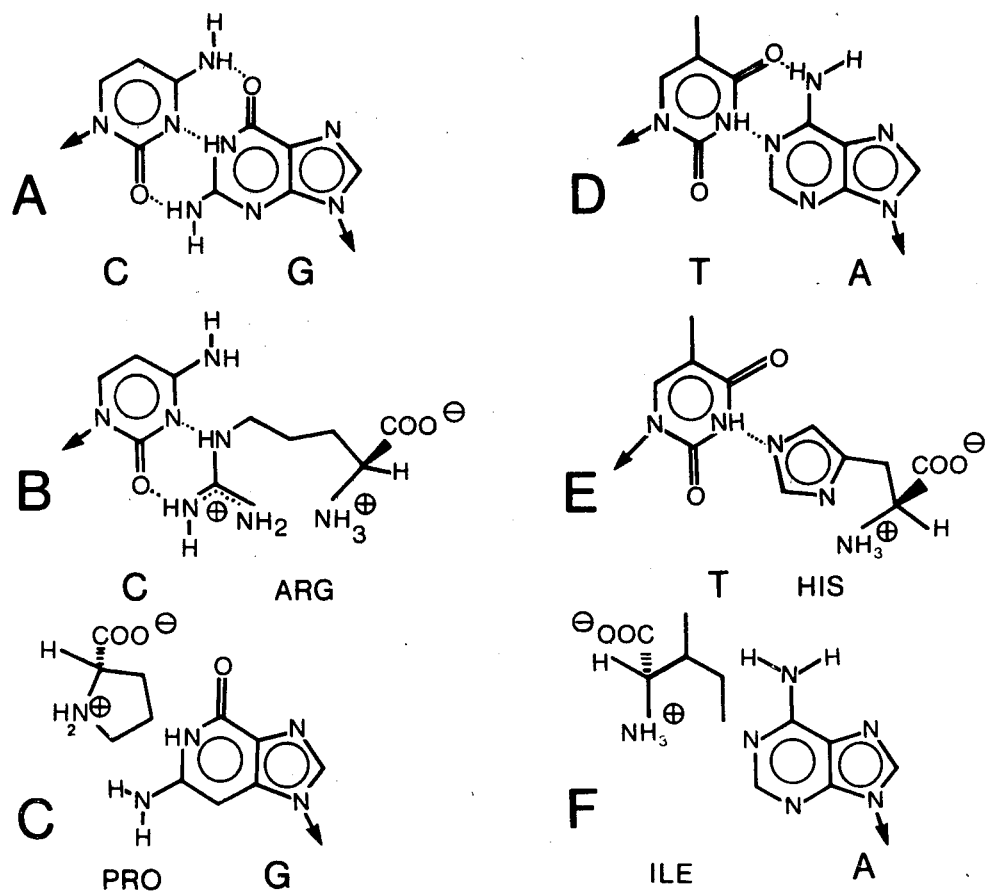
Figure 2:
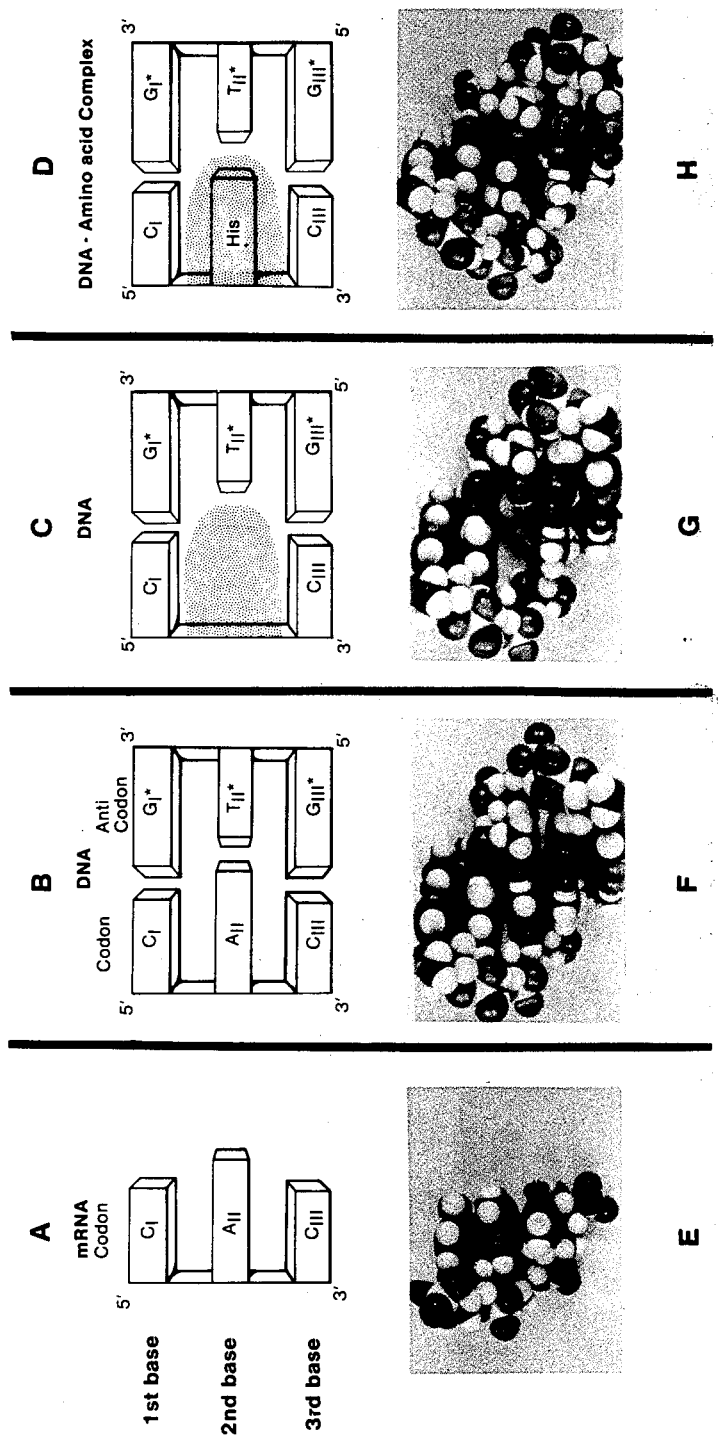
FIG. 2 illustrates the removal of the middle base from a triplet base sequence in DNA and of the complementary physiochemical fit of an amino acid in the resulting cavity.

Referring to FIG. 2, (A) is a diagram of the triplet sequence CAC—one of the codons for histidine—in mRNA; (B) in a diagram of double stranded DNA with the corresponding codon and anticodon base sequences; the first, second and third bases are indicated by Roman numerals and anticodon bases by *; (C) when the second base of the codon is removed from the CAC codon sequence, th resultant "cavity" is designated by a shaded area; $T_{II}$*, the second base of the anticodon, has been termed the "adjacent" base; (D) illustrates the insertion of L-histidine into the "cavity" formed by removal of the second base of its codon CAC; and (E-H) show CPK models corresponding to the diagram above.

The concept of pairing amino acids and nucleotide bases and the relative importance attached to the role of the second base position in the triplet code is supported by the established correlation of physiochemical properties of amino acids with nucleotide bases, in particular, with the second anticodon base. Studies of protein structure and protein synthesis have also suggested that the second base is the most influential in determining the chemical characteristics of the amino acid coded for, as well as limiting errors of translation.

In order to pursue a specific stereochemical rationale for the genetic code further, it was necessary to include the various possible chemical interactions of amino acid R groups and nucleic acid bases in the model building. Spectroscopic studies has previously shown that amino acid R groups could interact directly with DNA and RNA not only by forming hydrogen bonds with the functional groups of the bases but also could intercalate and form stereospecific hydrophobic stacking completes between bases. When closer examination of the stereochemical and related physiochemical factors which allowed the incorporation of amino acids into models of DNA with such ease and specificity, it became apparent that the stereochemical influences of the neighboring first and third bases of the codon (FIG. 2) were important to the molecular topography of the space in the B-DNA helix into which amino acids were fitted and needed definition.

The prediction method of the present invention applies to all nucleic acids, including double-stranded DNA, double-stranded RNA and double-stranded DNA-RNA complexes. Models based upon B-DNA rather than other forms of DNA or RNA were employed, because the X-ray structure of B-DNA is known. For instance, mRNA-tRNA complexes could be utilized which might be of more direct relevance to the code but would also allow the 2' hydoxyl group of ribose to form a covalent linkage to the carboxy group of an amino acid which is the linkage known to exist in tRNA, providing potentially a more appropriate anchor for the amino acid in the cavity. The method of this invention would proceed slightly different with RNA and DNA-RNA complexes than with DNA. This stems from the fact that the stereochemistry of the two categories is slightly different. Whereas the B form of DNA has a uniform, defined X-ray structure which is identical from one strand to another, RNA and DNA-RNA complexes have many different forms and only some of these have been defined in terms of their X-ray structure. In other words, DNA's structure is an absolute whereas RNA and DNA-RNA complexes are relative. Therefore, it is not feasible to describe the structure of RNA or DNA-RNA complexes in general; they can only be described as individual structures. Nevertheless, for any given RNA or DNA-RNA complex whose X-ray structure is known, the same steps can be followed as for DNA and the prediction method and results will be still be valid.

Refinements in the structure of the B form of DNA remain to be investigated, such as variations in the angle of twist of bases about the helix axis which have recently become evident. Certain conformations of DNA, such as zDNA, would, of course, yield a very different series of cavities and potentially different stereochemical interactions with small molecules. Cavities have been constructed using the pyrimidine uracil which occurs in RNA in place of thymine; while the pattern of fits of the amino acids into the resultant cavities is slightly different, it appears to correlate just as well with the genetic code.

Scale models of the space formed by the removal of a base from CPK models of DNA were constructed (FIG. 2). Each of the resulting sixty-four possible spaces are simply called "cavities" for the lack of a better term and possess unique physiochemical and topological features. The "cavities" present evidence for: (1) a stereochemical correlation between individual DNA cavities which is consistent with the general pattern of the genetic code; (2) a stereochemical fit (in some cases apparently "lock and key") of the amino acids into certain specific cavities; and (3) a remarkable correlation of the fits of the amino acids in cavities to the genetic code.

While the present approach is derived from conventional physiochemical relationships between base pairs in DNA (including hydrogen bonding and stacking interactions) as well as from steric constraints related to the known position of the bases in a B-DNA double helix, the cavities are no more than artificial constructs. Thus, it is not suggested that the cavities are real, that they are germane to the evolution of the code, or that they are involved in the mechanism of transcription or of translation. It is believed, however, that the cavities provide new evidence that there may be a stereochemical rationale for the genetic code.

B. Construction of the "Cavities"

Corey-Pauling-Koltun models of the B form of DNA were made which approximate the published X-ray coordinates of the NIH computer graphics system. A single base was then removed without disrupting the remainder of the DNA structure (see FIG. 2). To simplify the modeling of the resulting cavity, the DNA was reconstructed without the sugar-phosphate backbone, with flat profiles of the neighboring 5' and 3' bases (the first (I) and the third (III) bases, respectively). The "adjacent" second base (II*) is used as a spacer (see FIG. 3). The dyad axis serves as a convenient reference point to fix the positions of the bases accurately. Because of the symmetrical properties of B-DNA, the relative position of the deoxyribose-phosphate backbone does not vary significantly with base sequence; the contribution of the backbone can therefore be considered to be constant for each cavity.

To define topology, the cavities are filled with wax, contouring the surfaces by connecting the closest points on the outside perimeter of the profiles of the neighboring 5' by 3' base pairs. The positive wax image of a cavity is thus an approximation of the overlap of the surfaces of atomic orbitals between the "adjacent" middle base of one strand and the neighboring 5' and 3' bases of the opposite strand. The wax figures are then removed and used to recreate cavities as negative images in silastic RTV polymer (Dow Corning) (FIG. 3). Detailed description of the technical aspects of construction can be found elsewhere. Kirbo, L. (1981), Masters thesis, Medical College of Georgia.

FIGS. 3 A-J illustrate the construction of a cavity model in DNA:

(A) Cytosine(C)-guanine(G) photpgraphic profiles of CPK models for DNA base pairs;
(B) adenine(A)-thymine(T);
(C) a two dimensional overlay of profiles of base pairs: in 5' to 3', direction the double stranded DNA codon sequence CAC on the left, and 3' to 5' inticodon sequence GTG on the right;
(D) the same profiles with second codon base A removed;
(E) three dimensional form used to define the "cavity" formed by the removal of A from CAC as in FIG. 3B above; the boundaries of the cavity are defined by the surface of the adjacent bae, here $T_{II}*$ and the shortest vertical lines connecting the profiles of the base pairs I and III;
(F) a wax mold is made of the cavity shown in FIG. 3E;
(G) the third base pair ($C_{III}$-$G_{III}*$) has been removed;
(H) positive wax mold of the cavity;
(I) negative image of the "cavity" in RTV polymer made from wax positive shown in FIG. 3H representing the cavity derived from CAC codon; and
(J) fit of a CPK model of L-histidine in the cavity formed from the CAC codon.

In this first approximation of the cavities, the "knobby" features of the neighboring bases (i.e., the surfaces of orbitals), which would be shown in really accurate maps of their topology have been ignored. The less detailed models greatly simplify comparison of the cavities to one another. Examination of models which include the entire surface indicates that the topology of the cavities is not markedly affected by these features.

C. Other Methods to Construct "Cavities"

There are a number of alternative ways to construct the cavities described above. For example, instead of using CPK models of DNA, the absolute X-ray space filling coordinates of DNA (from the NIH Computer Graphics Center) have been used to construct the same cavities (to the scale of CPK models) with the exception that the positive images were constructed from "Oasis," a commercially available material used by florists.

D. Relationship of the "Cavities" to One Another and to the Pattern of the Genetic Code In the genetic code shown in FIG. 7, an amino acid can be coded for by as few as one or as many as six triplet codons in the 5' to 3' direction. Most of the sixty-four codons are redundant with respect to the third base. If an amino acid has two codons, the third base is always either a purine or a pyrimidine. If an amino acid has four codons, there is redundancy only in the third base position.

Further inspection of the codon catalogue reveals that all amino acids having T (U in RNA) as the second codon base (phenylalanine, leucine, isoleucine, methionine and valine) are hydrophobic; conversley, all amino acids with A as the second codon base possess hydrogen bonding R groups and are hydrophilic. Some amino acids which are closely related in chemical structure have codons which differ only in a single base, e.g., asparagine (AAC,AAT)—aspartic acid (GAC,GAT); glutamine (CAA,CAG)—glutamic acid (GAA,GAG); phenylalanine (TTC,TTT)—tyrosine (TAT,TAC); valine (GTX)—isoleucine (ATC,ATT,ATA). There are two codons, related by a single base change, which never code for any amino acids: TAA and TAG. These codons and TGA, which in some instances codes for tryptophan, are "stop" codons which provide signals for the termination of translation.

Figure 4A:
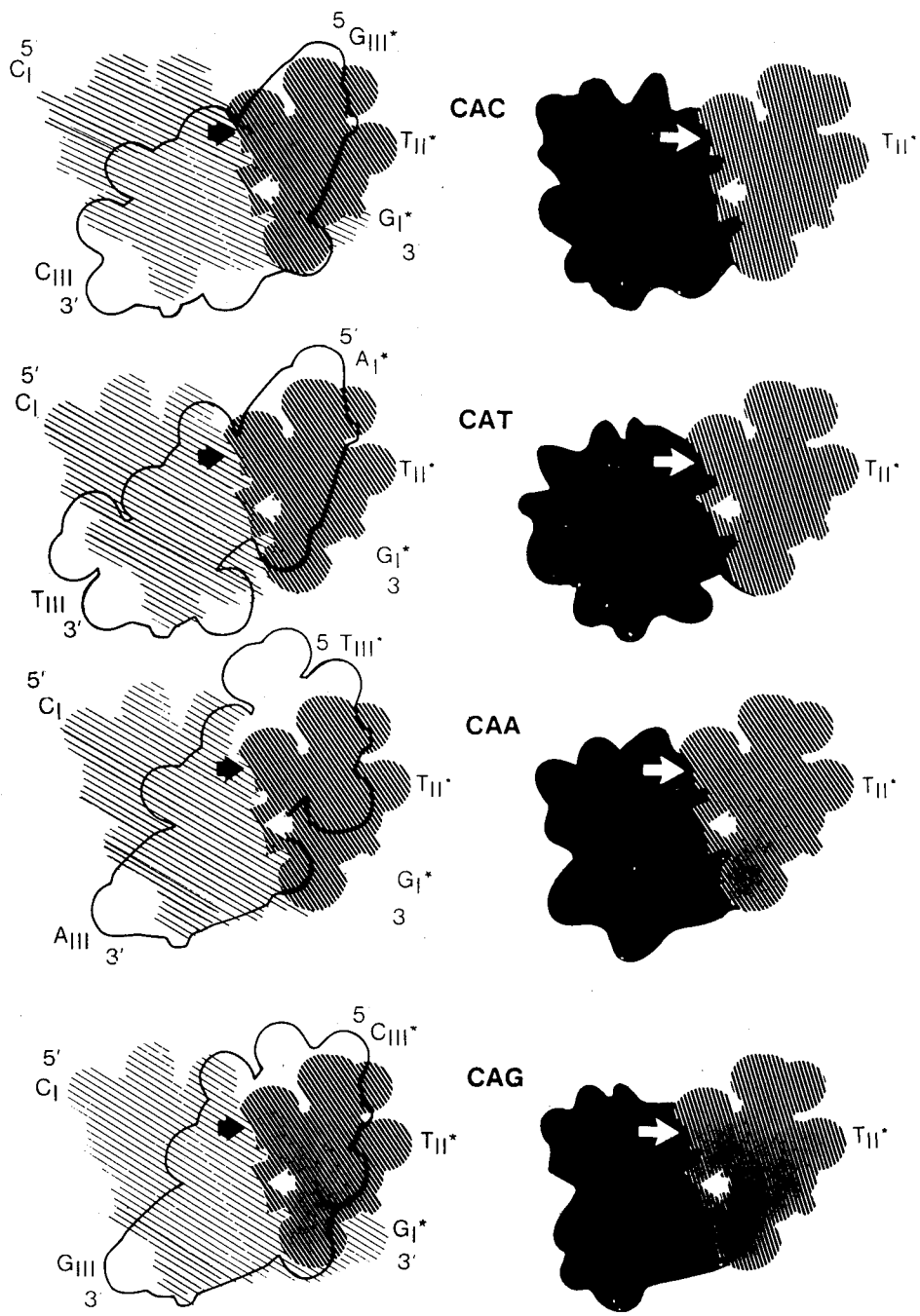
FIGS. 4A–C show two-dimensional profiles depicting the overlay of triplets of bases in double stranded DNA after the middle base has been removed.
Figure 4B:
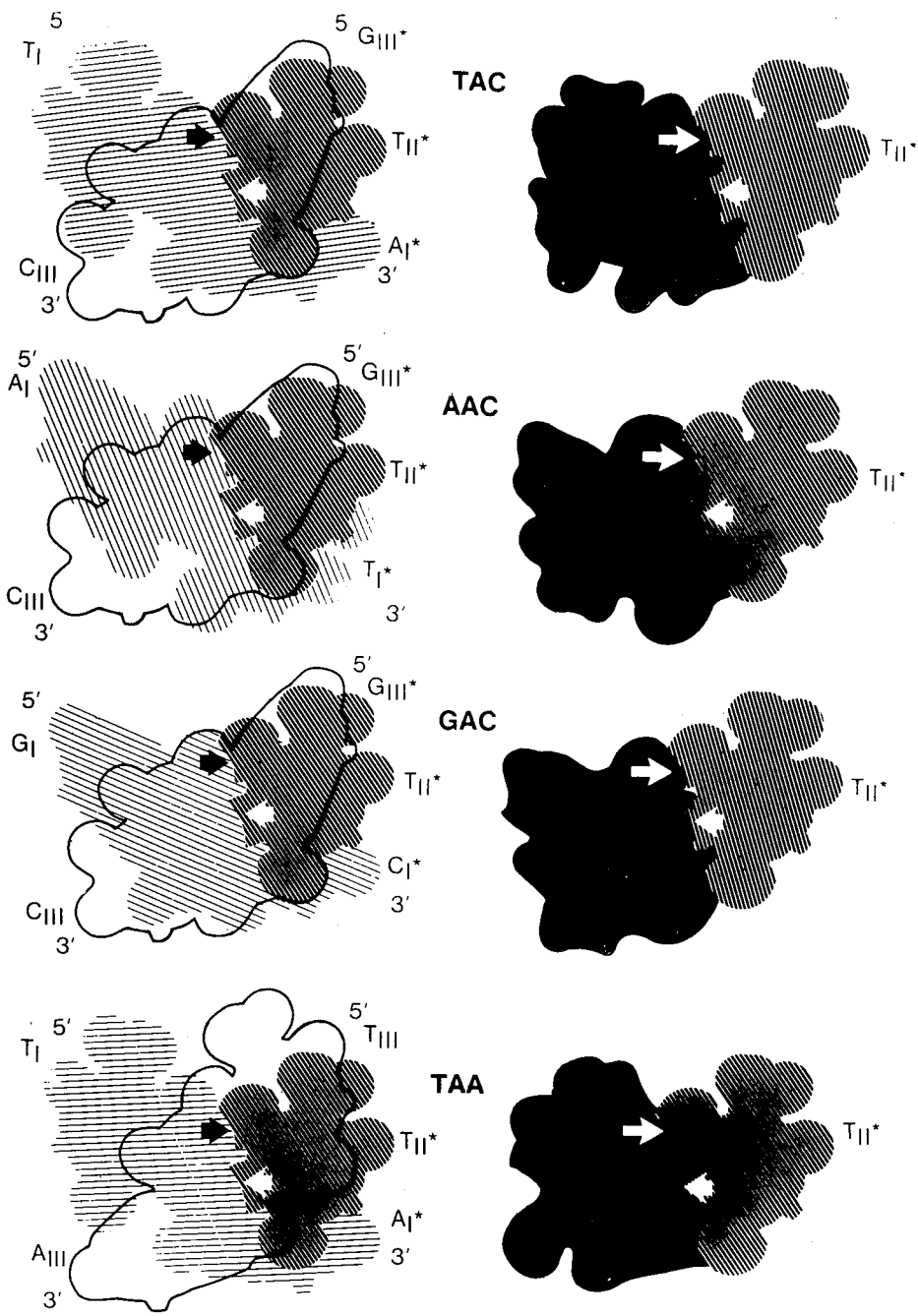
Figure 4C:
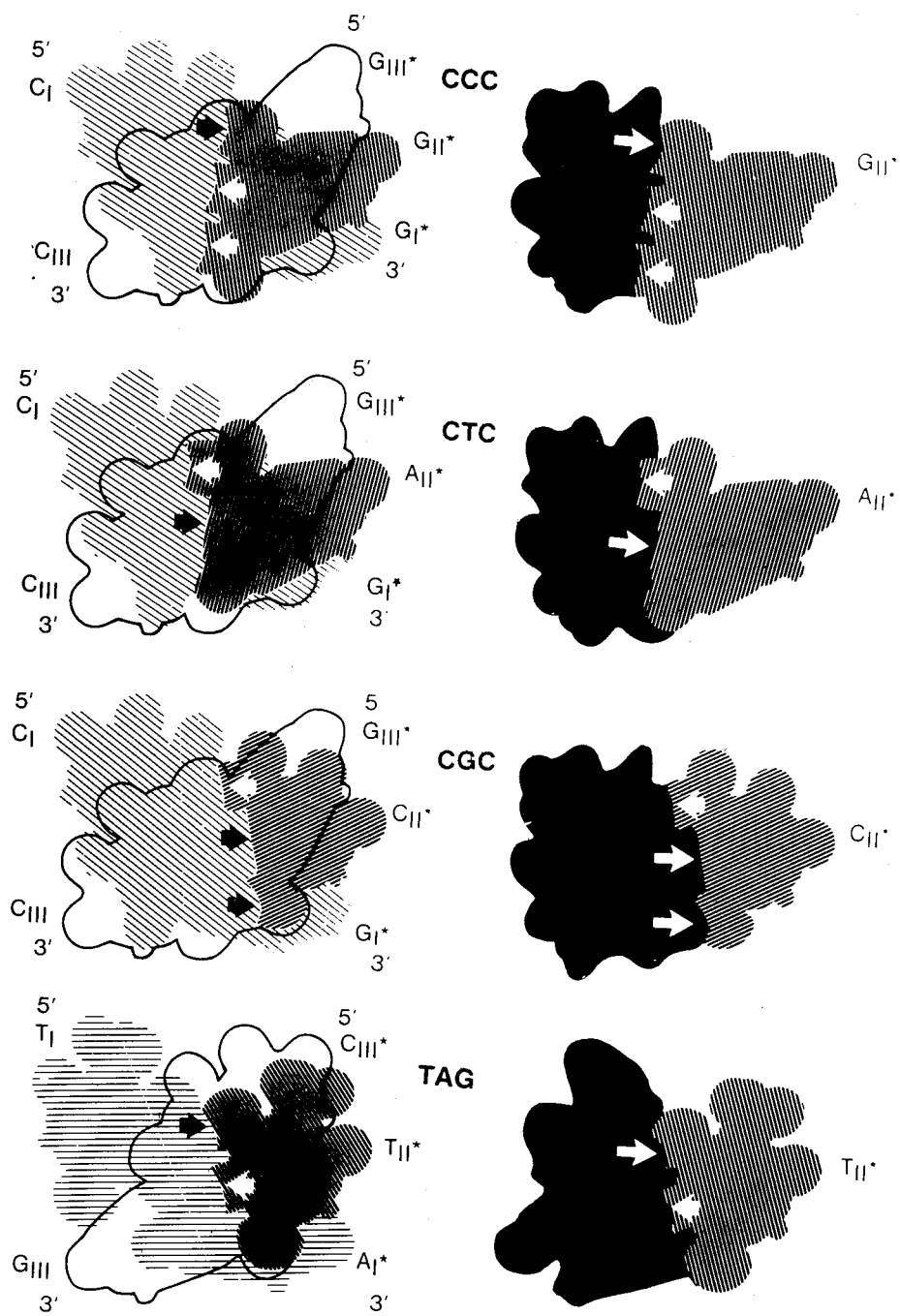

Each of the sixty-four cavities constructed from the sixty-four possible triplet sequences in DNA has a unique size, shape and set of physiochemical features. In FIGS. 4A–C, the effects of changing a base on one cavity formed from the codon sequence CAC (the middle base A was removed) are illustrated by the two dimensional overlap of base profiles and by the shape of "center slices" of the cavities—silhouettes drawn from a slice parallel to the base pairs through the middle of each cavity.

Regardless of the particular cavity being studied, changes in the 3' or third base generally affect the size, shape and physiochemical properties least because of the right handed helical coiling of DNA [i.e., less of the third base overlaps the cavity (FIGS. 4A–C)]. Due to their structural similarities, a change in the third base from pyrimidine to pyrimidine (CAC/CAT) or purine to purine (CAA/CAG) affects the cavity less than a purine—pyrimidine transition (e.g., CAT/CAA). Changes in the middle base position (e.g., CAC/CCC) have little impact on the overall shape; those changes obviously have a substantial effect on the volume of cavities but can alter their shapes considerably.

The features of the cavities which are revealed by changing bases reflect the pattern of the genetic code. The minimal effect of changes in the third base on cavities, in particular purine to purine or pyrimidine to pyrimidine transitions, in comparison to changes in the first or second base, is consistent with the overall redundancy of the third base in the genetic code. For example, the cavities constructed from CAG and CAA are almost identical to each other; both of these are codons for L-glutamine. The cavities constructed from codons CAC and CAT code for the same amino acid L-histidine, and are different from those associated with L-glutamine. Changing the first or second bases of CAC, one of the L-histidine codons, gives rise to very different cavities. For example, AAC and CGC code for L-lysine and L-arginine, respectively.

The importance of the second base to the physiochemical characteristics of the cavities is consistent with the physiochemical grouping of amino acids and the second base of their codons. All amino acids having codons with the second base A have hydrophilic R groups; the cavities created from their codons are all related by the same adjacent base (T). Conversely, cavities derived from all codons with the second base T have the adjacent base A and code for hydrophobic amino acids. The first codon base which has the greatest effect on the shape of the cavity also seems to be of some significance to the pattern of the code. For example, some of the structurally related amino acids [those with phenyl rings (phenylalanine-TTC/TTT; tyrosine-TAC/TAT) and chiral R groups (threonine-ACC/ACT/ACA/ACG; isoleucine-ATC/ATT/ATA)], have codons which have the same first base but differ in the second base. The structures of these amino acids and the cavities associated with their codons have very similar shapes (not shown). The relationship of cavities to the code is even more compelling when cavities constructed from two of the three stop codons (TAA/TAG) are examined. They have topological and physiochemical properties which are closely related to each other but are distinct from the other sixty-two. The third stop codon, TGA, which occasionally codes for tryptophan has a similar shape to TAA and TAG but differs in hydrogen bonding character due to the difference in the second base (G versus A).

E. Utility of the "Cavities"

The cavities constructed above have been used to fit Corey-Pauling-Koltum models of L-amino acids. All of the L-amino acids used for the synthesis of protein which possess R groups fit specifically into cavities which are formed by removal of the second base of their codons. Fits of the CPK models of each of the twenty L-amino acids into DNA were demonstrated as follows. The α-amino group of the amino acid was placed in a position in the cavity where the missing purine or pyrimidine would have been attached to deoxyribose (at N-9 or N-1, respectively). The possible conformation of the amino acid models to be considered as fits were subject only to three constraints:

1. Amino acids having R groups with hydrogen bonding heteroatoms were placed so that they would form complementary hydrogen bonds to the adjacent base. The hydrogen bond between the R group and the adjacent base was considered complementary if the direction of the bond was not more than ten degrees out of the plane defined by the hydrogen bonding angle of the adjacent base. In all cases, with the exception of L-lysine and L-tyrosine (which form hydrogen bonds to O-4 of the adjacent base T), the amino acids were hydrogen bonded to either N-1 of the adjacent purine or N-3 of the adjacent pyrimidine. FIG. 5 lists the complementary hydrogen bonding groups of the hydrophilic amino acid R groups and of the adjacent bases. Because the directionality of hydrogen bonding is known to be an important criterion for the strength of chemical interaction between biological molecules, as exemplified by Watson-Crick base pairs themselves, this appears to be a reasonable criterion for fit.

2. All amino acid R groups were required to come in contact with the adjacent base. This seems a reasonable requirement inasmuch as physiochemical interactions between hydrophobic surfaces require contact within Van der Waals radii.

3. To partially define the steric limitations imposed by the cavities, it has been assumed that any conformation of an amino acid which extends beyond the boundaries of a cavity cannot fit into it. For present purposes, a non-fit is defined as having approximately ten percent or more of the volume of the R group protruding out of the cavity. An example of the fit of histidine into its codon cavity formed from CAC is shown in FIG. 6, with A illustrating the cavity formed from CAC (cf., FIG. 3), the cavity with a CPK model of L-histidine inserted (B) and C showing the cavity with histidine inserted showing the potential for hydrogen bonding with the adjacent second base thymine, an arrow indicating the location of the hydrogen bond.

There has not, of yet, been an attempt made to specify the exact position of the α-carboxylate group of an amino acid in a cavity. Preliminary observations of the fits of CPK models of each amino acid into all sixty-four cavities using CPK models of the entire DNA helix indicate that the carboxy group can extend in the direction of the minor groove of DNA. Using CPK models and the NIH X-ray computer graphics system, it has also been found that the 2-hydroxy group of ribose in double-stranded RNA could serve as a connector to an amino acid through an ester linkage (as in t-RNA); the fits of amino acids were similar to those observed using DNA cavities.

Using these criteria, the amino acids fit remarkably well into cavities formed from their codons. (See FIG. 6) The considerable specificity exhibited by the fits of the amino acids into the cavities constructed from their codons are summarized below in FIG. 7:

(A) All nineteen L-amino acids with R groups fit into one or more of the sixty-four possible cavities.

(B) All nineteen amino acids fit the cavities associated with their codons, (i.e., the cavity formed by removal of the second codon base).

(C) Amino acids fit into cavities associated with their codons in the 5' to 3' direction and not generally in the 3' to 5' direction (obvious exceptions would be symmetrical codons, such as CTC, etc.). This is consistent with the genetic code.

(D) All amino acids having hydrophilic R groups can form complementary hydrogen bonding pairs with the "adjacent" or second base of their anticodons.

(E) When one of the nineteen amino acids cannot be fitted into a specific cavity, the situation with approximately eight percent of the possible 1,280 combinations, the cavity into which they cannot fit is not one associated with any of the codons for the amino acid.

(F) When an amino acid fits into a cavity not associated with any of its codons, the codon from which that cavity is derived often differs in only a single base. When this occurs, the cavities usually appear to be stereochemically related, and in many cases are associated with structurally related amino acids (e.g., tyrosine-phenylalanine; valine-isoleucine; isoleucine-leucine; asparagine-aspartic acid; glutamine-glutamic acid; threonine-serine; threonine-isoleucine).

(G) Cavities derived from two of three stop codons, TAA and TAG, have unusual topologies which do not accomodate any amino acid.

(H) Glycine, which does not possess an R group, does not fit into any cavity including those formed by removal of the second base of its codons (GGX);

(I) In general, nucleic acid bases are surprisingly poor fits for many of the cavities derived from models of DNA; a notable exception is guanine which appears to fit the cavities formed by removal of the second base of the glycine codon, GGX.

Figure 7:
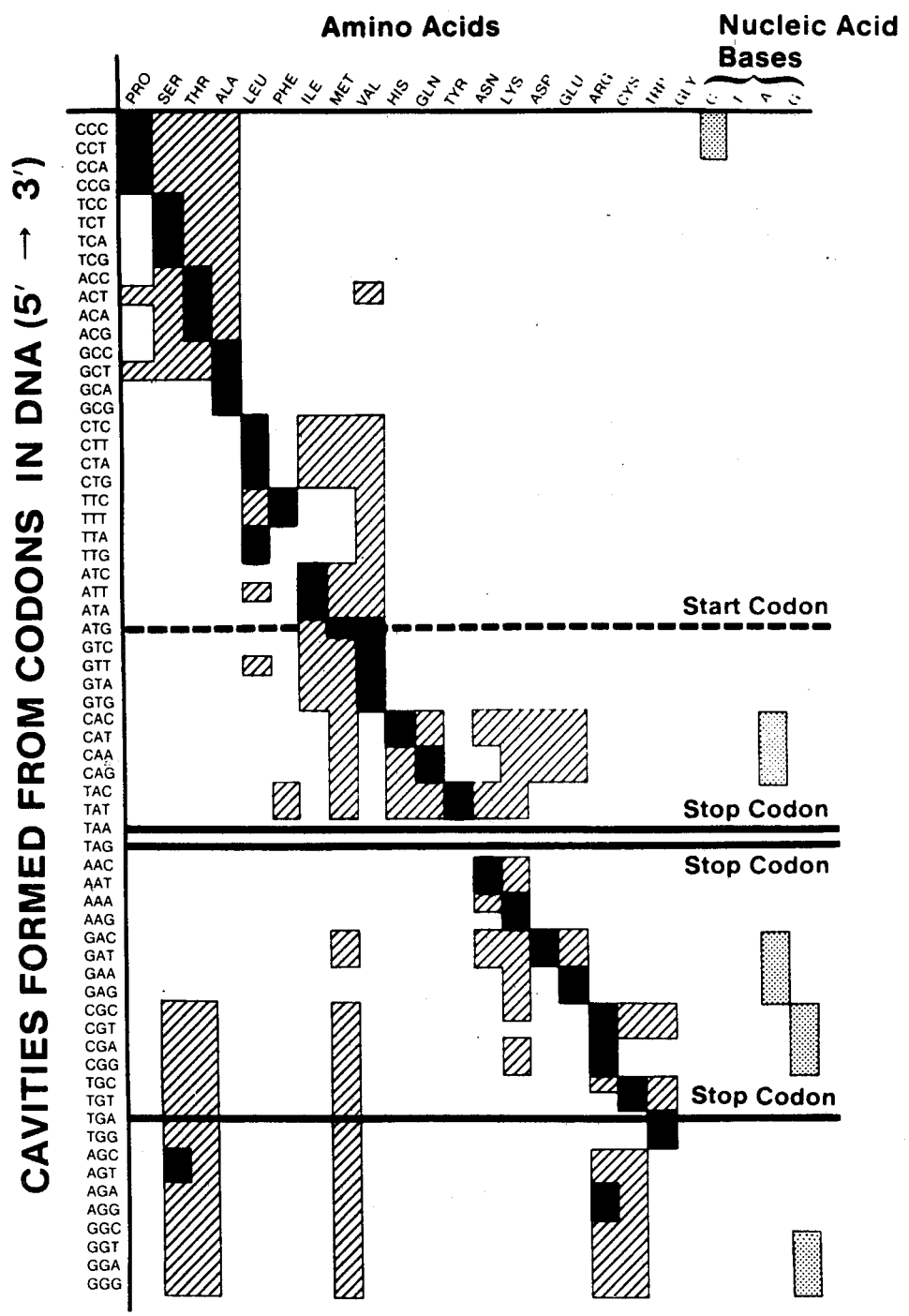
FIG. 7 lists the stereochemical fit of L-amino acids into the cavities constructed from their codons.

FIG. 7 graphically illustrates the preliminary stereochemical fits of L-amino acids into the sixty-four possible "cavities" formed by removal of the middle base (II) of double-stranded triplets in DNA, as in FIGS. 2-4. Dark shaded areas indicate that the amino acid fits into "cavities" formed from their codons; cross-hatched lines indicate alternate fits of amino acids into cavities which are not directly associated with their codons. Unshaded areas indicate that that amino acid does not fit into the "cavity." In all cases except glycine (GGX), the amino acids fit cavities formed from their codons. Fits of the nucleic acid bases into the cavities are indicated by stippled patterns.

These preliminary stereochemical fits are clearly consistent with the overall pattern of codon assignments in the genetic code which has been based on experiments involving the translation of amino acids from synthetic oligonucleotide templates into oligopeptides. While some of the alternate fits in FIG. 6 do not reflect directly upon the codon catalogue, measurements of the energetics and development of a more accurate three-dimensional topology for defining the cavities should result in more rigorous criteria and, therefore, in specificity. The stereochemical precision of the cavities might also be improved if it ever becomes possible to construct cavities based on the tertiary structure of RNA.

As noted above, the only exception to these hopeful generalizations is glycine which lacks an R group and does not fit into any cavity by the above criteria. The nonfit of glycine into the cavities derived from its codons may be related in some way to the reasonably good fit of guanine into these cavities; guanine is known to have strong stacking interactions with other guanine bases in the DNA double helix and can form three hydrogen bonds when paired with cytosine.

Specific Observations of the Qualitative Fits of Amino Acids on Cavities

L-Proline—fits very well into cavities formed from its four codons (CCX). Proline appears to form complementary hydrophobic contacts with the adjacent anticodon second base and the R group of the amino acid cannot come in contact with the surfaces of the adjacent base in cavities having C, T, or A as the second anticodon base.

L-Serine—depending upon its conformation to the adjacent base, can form complementary hydrogen bonds with either G or C, the adjacent bases within its codon cavities. This condition is met in cavities derived from all six of its codons TCX, AGT and AGC. Because of the relatively small size of its R group, serine can fit a number of cavities but conforms most closely to those formed by four of its six codons (TCX).

L-Threonine—like serine, can form complementary hydrogen bonds with either G (its "adjacent" codon base) or C. It fits into many of the sixty-four cavities as does serine but cavities derived from its four codons ACX (cf. isoleucine) provide snug fits (almost lock-and-key) of the chiral R group.

L-Alanine—is the smallest amino acid containing an R group ($CH_3$). Its four codons GCX form very small cavities into which the methyl group of the amino acid fits tightly. Alanine fits very loosely into cavities in which the second anticodon adjacent base is C, T, or A and, therefore, cannot form a complementary surface with those bases.

L-Leucine—can be fitted quite well into all six of its codon cavities; codons TTA and TTG are relatively tight fits, however, and less favorable than CTX.

L-Phenylalanine—was one of the amino acids which has no clearly discernible stereochemical analogy to nucleic acid bases until the above-described cavities were constructed. It fits into cavities formed from its codons TTT and TTC; the aromatic phenyl ring can stack neatly between the first and third bases which border the cavities (both are pyrimidines: T and T or T and C). Phenylalanine also fits TAT and TAC, the codons for the structurally and metabolically related amino acid tyrosine. Since TAT and TAC form larger cavities than TTT and TTC, phenylalanine fits the tyrosine cavities more loosely than the larger tyrosine molecule. Conversely, tyrosine will not fit TTT or TTC, because it cannot form appropriate hydrogen bonds with the "adjacent" anticodon base A.

L-Isoleucine—possesses a chiral R group due to a methyl branch at C-3 which has the same stereochemistry as the methyl group of threonine. When fitted into the cavities derived from its codons (ATT, ATC, ATA), isoleucine is very similar in conformation to threonine fitted into cavities derived from its codons, ACX. Both amino acids possess the same first base (A) in their codons; thus, the corresponding cavities also have similar shapes. Isoleucine fits particularly well into cavities derived from two of its three codons, ATC and ATT.

L-Methinonine—is a relatively bulky amino acid which fits a number of cavities including the one derived from its codon ATG, into which it fits tightly. Its analog in RNA, AUG, is the "start" or initiation codon for protein synthesis. While methionine can be considered as forming a hydrogen bond between its sulfur atom and the 6-NH$_2$ of A—the adjacent bases in its cavity, it cannot be stated that methionine specifically fits into only one cavity.

L-Valine—is structurally related to isoleucine, having a methyl group at C-3; valine fits into cavities derived both from its own codons and those for isoleucine.

L-Histidine—can form a complementary hydrogen bond only when the adjacent base to the cavity is T; histidine fits closely into the cavities derived from its two codons CAC and CAT (see FIG. 6). While cavities generated from CAA and CAG which are codons for glutamine are listed (FIG. 7) as potential alternate fits for histidine, a portion of the histidine molecule will protrude from those cavities.

L-Glutamine—fits very well into the cavities derived from its two codons CAA and CAG. Glutamine can form two complementary hydrogen bonds to the adjacent base T, at O-4 and N-3.

L-Tyrosine—fits the cavities formed by its codons TAT and TAC uniquely. A hydrogen bond can be formed between the hydroxyl group of the amino acid and the adjacent base T at O-4. The aromatic ring of tyrosine can also stack neatly in an energetically favorable position between the aromatic rings of the neighboring pyrimidines, the first and third codon bases bordering the cavity. This stacking is similar to that observed when phenylalanine is fitted into the cavities derived from its codons.

L-Asparagine—fits reasonably well into the cavities derived from its codons AAC and AAT. It can form a complementary hydrogen bond to the adjacent base T at N-3. Complementary hydrogen bonding to another adjacent base is not feasible. Asparagine can also fit into the similarly shaped cavities for the structurally related amino acid aspartic acid.

L-Lysine—fits into its codon-anticodon cavities so that there is a hydrogen bond between the $\epsilon$-NH$_3$ moiety and the O-4 of T, the adjacent base. Lysine also fits, albeit poorly, into some cavities in which C is the adjacent base by hydrogen bonding at O-2 of C.

L-Aspartic Acid—is an excellent fit for its cavities GAC and GAT where a hydrogen bond can be formed between a carboxylate oxygen and N-3 of T, the adjacent base. Aspartic acid can also fit into one of the cavities derived from the asparagine codons, AAT, as well as cavities derived from the histidine codons, CAC and CAT, which are larger.

L-Glutamine Acid—fits into the cavities formed from its codons GAA and GAG, forming a hydrogen bond between a carboxylate oxygen and N-3 of T. Glutamic acid also fits CAA and CAG, codons for the structurally related amino acid glutamine.

L-Arginine—has a large R group in comparison to other amino acids and fits the relatively large cavities derived from all six of its codons CGX, AGA and AGG. The guanido group of arginine can mimic guanine in forming two complementary hydrogen bonds with the adjacent base C at N-3 and O-2. The conformation of the arginine side chain when fit into cavities derived from CGX is different from the conformation in AGA and AGG where there is a tight fit. There does not appear to be a unique stereochemical fit of arginine to cavities associated only with its codons (e.g., arginine also fits into the cavity derived from AGC, a codon for serine).

L-Cysteine—is a relatively small amino acid, but like serine has a conformation which will permit a hydrogen bond to N-3 of the adjacent base C in the relatively large cavities formed by its codons, TGT and TGC. However, very little topological specificity is suggested by its fits.

L-Tryptophan—possesses a relatively large indole ring which is too large to fit into most of the cavities; it is a tight fit for the cavity formed by its codon TGG. Tryptophan also fits into the cavity derived from TGA which can also code for tryptophan in yeast and in human mitochondria. TGA is a stop codon in pyrocaryotic cells. The indole-NH can form a hydrogen bond with cavities having the adjacent base C at N-3 which are also the largest cavities. The first base of the codon T provides a surface large enough for the top of the cavity to accommodate the aromatic rings stacked between T and G (the third base bordering the cavity).

Glycine—is the only amino acid which does not possess an R group or side chain and hence does not fit any cavities by the above-described criteria. Relatively large cavities are formed from its codons, GGX. The nucleic acid base guanine is a relatively good fit for these cavities.

STOP Codons—cavities derived from TAG, TAA, and TGA have generally oblique shapes with unique skewed helical topologies. The TAA and TAG cavities in particular are poor fits for all amino acids (see FIGS. 4B and 4C).

Nucleic Acid Bases—fit into cavities poorly with a few exceptions; for example, guanine can fit into the codons for glycine, GGX. In most cases, the amino acids are better fits for their cavities than any of the bases which were removed to form the cavities themselves. Obviously, it would be premature to attach too much significance to this observation until proper quantitative data are available to describe the relative energetics of fits.

DISCUSSION

The topological and physiochemical relationship between cavities forms from codon-anticodon sequences in double-stranded B-DNA, the stereochemical fits of amino acids into the cavities, and the physiochemical complementary of amino acids to the specific cavities associated with their codons are consistent with the pattern of the genetic code. However, it should always be understood that the cavities do not in themselves represent the stereochemical logic of the double-helical structure of B-DNA. The remarkable complementary lock-and-key fits of several of the amino acids into cavities formed from their codons along with the obvious inability of many alternative amino acid structures to fit any DNA cavities (e.g., aromatic amino acid structures which have one or more methylene groups added to their side chains would be unable to fit into any cavity) suggest that stereochemical features of the genetic code may be related to constraints on the number and structure of the amino acids used for the biosynthesis of proteins.

These preliminary findings may be interpreted as strong evidence that the genetic code has a stereochemical basis, whether or not it is precisely the one as proposed above. Although the models of cavities of the present invention represent a new stereochemical approach to the genetic code, there is a large body of prior work which can be considered as supportive. Jungck, for example, found when he made an exhaustive examination of the physical properties of amino acids and nucleic acid bases that the polarity, bulkiness and specific volume of the amino acids (precisely the attributes important for fitting into cavities) could be correlated with the code, *J. Mol. Evol.*, vol. 11, pages 211-224 (1978); experiments by Weber and Lacey, *J. Mol. Evol.*, vol. 11, pages 199-210 (1978); and Nagyvary and Fendler, *Origins of Life*, vol. 5, pages 357-362 (1974), using chromatographic techniques have shown that the polarity of an amino acid can be correlated with that of the second base of its anticodon, suggesting that amino acids might form specific complexes with nucleic acid bases. Wolfenden et al., *Science*, vol. 206, pages 575-577 (1979), have also demonstrated that the relative hydration potentials of the amino acids can be correlated with the second base in the code.

The importance of the second base position in determining the properties of the amino acids has also been emphasized in a computer generated code by Alf-Steinberger, *Proc. Natl. Acad. Sci.*, USA, vol. 64, pages 584-591 (1969), and by studies of protein structure by Dickerson, *J. Mol. Biol.*, vol. 57, pages 1-15 (1971); *Biochem. Biophys. Acta*, vol. 119, pages 421-424 (1966); and Zhdanov, *Doklady Academii Nauk USSR*, vol. 217, pages 456-457 (1974). Woese, who has long been a proponent of a stereochemical rationale for the code, also proposed that base-amino acid pairing played a role in the shaping of the code. *Biochem. Biophys. Comm.*, vol. 5, page 88-93 (1961); *Proc. Natl. Acad. Sci. USA*, vol. 54, pages 71-75 and 1546-1552 (1965) and vol. 59, pages 110-117 (1968); *The Genetic Code: The Molecular Basis for Genetic Expression*, (Harper and Row, New York) (1967); *Bioscience*, vol. 20, pages 471-485 (1970); and *Naturewissenchafen*, vol. 60, pages 447-459 (1973). He also notes the strong correlations between the second base and the amino acid coded for in that errors in translation occur with frequency of 1:10:100 in the II:I:III bases of the codon, respectively. The relative effects of base changes on the physiochemical properties and topology of the cavities is also II>I>>III.

There are some weaknesses in the above discussion. Perhaps the most significant is that there may be a bias inherent in a prior knowledge of the existence of the genetic code. It would have been preferable, albeit unrealistic, to have first established the genetic code via a stereochemical rationale and then to have subsequenlty proven its existence in the laboratory with synthetic oligonucleotides. The above stereochemical argument is based upon cavities which are, so far, untested artificial constructs. Their topologies can at present be considered only rough first approximations. In this regard, while continuing studies suggest that the cavities in DNA may be helpful in understanding the structural, metabolic and mutagenic relationships between amino acids, there is no evidence that cavities have ever existed in the evolution of the code or that they have any relevance to the processes of transcription or translation.

X-ray diffraction data is currently being utilized to construct computerized models of the cavities which can be used for calculations of the energetics involved in the fit of amino acids. Several factors will have to be taken into account if the relative degrees of fit of amino acids into a cavity are to be rigorously compared:

(1) the ability of hydrophilic amino acids to form complementary hydrogen bonds (for appropriate distance and angle analogous to Watson-Crick base pairing) to the adjacent base in the cavity;

(2) the degree of overlap of amino acid R groups with the neighboring first and third bases in the cavity (i.e., the stacking of aromatic rings of amino acid R groups with the aromatic rings of the first and third bases); and (3) the ability of an R group of an amino acid to fill the cavity and form a complementary surface contact with the adjacent base.

Although the stereochemical relationships between the cavities and the respective fits of CPK models of the amino acids have not yet been fully evaluated by computer methods, it has been possible to show that the complexes of amino acids and nucleic acids can be constructed directly from X-ray coordinates using the NIH X-ray computer graphics system. As an example, the fit of L-listidine into the B form of DNA in place of A in the sequence CAC, a codon for histidine, with the entire phosphate-deoxyribose backbone attached, has been shown in a computer-generated X-ray space filling photograph. Computer-generated complexes of amino acids associated with their codons are consistent with the stereochemically complementary fits into the cavities, confirming that certain amino acids side chains are "lock-and-key" fits into DNA cavities. Some side chains are slightly bulkier than the bases originally removed from DNA; the -carboxy groups are generally oriented in the 5' direction in the minor groove—an orientation which would permit a covalent linkage to the 2' hydroxy of ribose in double-stranded RNA or in a RNA-DNA complex.

It has previously shown with models that some amino acids may be capable of intercalation between the first two bases of their codons in double-stranded nucleic acids (DNA or RNA), allowing for shifting and pairing of the adjacent (second) base of the anticodon with the amino acid R group; Hendry, et al., *Persp. Biol. Med.*, vol. 22, page 333-345 (1979). Subsequent removal of the entire second codon nucleotide would result in cavities similar to those described above, albeit with a different configuration of the sugar-phosphate backbone. The interaction of amino acid R groups in such cavities would be the same whereas the positions of the α-$NH_3^+$ and the carboxylate moieties would be different. If evidence that such intercalation occurs is forthcoming, it is suspected that the stereochemical approach described herein will be of value.

The fits of amino acids to the "artificial constructs" derived from their codons can also be used to correlate structures of amino acid derivatives and their metabolites and biological activity. Amino acids are utilized as precursors for the biosynthesis of other biologically active molecules. Thus, a molecule that is metabolically derived for, and is thus structurally related to, a molecular model of a given amino acid generally can be fitted into the cavity derived from the codon for that amino acid. Examples are the sympathomimetic aminesepinephrine, norepinephrine and dopamine which are derived from the amino acid tryosine. These and other sympathomimetic drugs have two carbon atoms which separate an aromatic ring from an amino group and which are required for activity. These two carbon atoms are similarly required to fit these pharmaceutical agents into the TTC or TTT codon cavities for tyrosine. Hydroxyl substituents at the 3 and 4 positions on the ring, which are common features of highly active sympathomimetics, facilitate hydrogen bonding within the cavities. Structures possessing a saturated cyclohexyl ring moiety (propylhexedrine) in place of phenyl also fit into the TTC and TTC cavities and are known to be biologically active.

Differentiation of the various classes of sympathomimetic activity with regard to clinical activity (i.e., $\beta_1$-, $\beta_2$-, α-receptor activity and CNS activity) also appears possible using the cavities. For example:

| Active Fit | Nonfit Not (Known To Be Active) |
|---|---|
| phenethylamine | benzylamine |
| epinephrine | propylamine |
| norepinephrine | cyclohexylamine |
| dopamine | 3-cyclohexylpropylamine |
| propylhexedrine | |
| tryamine | |

The structures of many antagonistic of sympathomimetic amines can be predicted by assuming that an antagonist must have special structural features which fit the cavity as well as moieties which either do not fit into the cavity or when fitted would distort the cavity. For example, the β-adrenergic block agent dichloroisoproteranol (an antagonist) fits part of the tyrosine-TAT codon cavity in that it possess a phenyl group separated by two carbon atoms from an amino group; however, the two carbon atoms at C-3 and C-4 on the ring are bulkier than the hydroxyls at those positions and would thus distort the cavity.

In determining the biological activity of a natural or a synthetic compound, the structure of the unknown could be: (1) compared to the structure of known, naturally occurring molecules; and (2) fit into the cavities already constructed. If the structure is analogous to a naturally occurring molecule, the molecule would then be fit into the cavity constructed for the naturally occurring molecule. If the molecule is not analogous to a natural product, the molecule would be fit into the cavities already constructed. If a molecule can be accommodated within an existing cavity as described above, it is likely to have the biological activity associated with the "parent" molecule.

A further utility of the present invention is the design of new biologically active compounds and their metabolites. The cavities can be used to design new compounds having a specific function by constructing models of various structures which will fit into a given cavity and possess the same hydrogen bonding points as the parent molecule. Such molecules can be made from a range of elements and need not contain carbon. For, example, silicon might be used instead of carbon.

Additional uses of the cavities of the present invention include the prediction of the metabolism of natural and synthetic products; prediction of the carcinogenic, teratogenic and general mutagenic potential of natural products, existing synthetic products and new products designed using the cavities; prediction of which specific mutations (changes in DNA base sequence) will result in diminished or altered biological activity of proteins or polypeptides; potential thereapy for correction of genetic diseases as, for example, the correction of mutations in the structural gene for hemoglobin resulting in sickle cell anemia; design of new proteins and peptides for specific biological functions; prediction and manipulation of tertiary structure of proteins and peptides (e.g., structures of enzymatic sites, receptors, antigens, etc.); prediction of potential therapy for metabolic and endocrine disorders; design and function of new matagenic agents and their antidotes; regulation of bacterial and other living systems to produce new compounds or to produce more (or less) of existing compounds; development of a testing program using the cavities to replace existing animal testing; and as educational models, including toys and puzzles.

II. "Artificial Constructs" of Stereochemical Complementary Cavities Constructed by Unwinding DNA A. Construction Cavities can be constructed between any sequence of base pairs upon unwinding right handed double helical nucleic acids, particularly DNA. Using the same degree of unwinding of the helix for any given sequence, there are only ten cavities formed; each cavity has a unique size, shape and set of physiochemical features.

The ten cavities were constructed using methodology similar to that previously described above regarding the formation of the base-pair removal cavities. Positive images of the space between neighboring base pairs were constructed from space filling profiles of the base pairs utilizing X-ray coordinates in the NIH computer graphics system. The profiles (scaled to the size of Corey-Pauling-Koltun (CPK) models) were oriented about the helix axis with uncoiling of the helix axis of 26°. (The stacking of the base pairs in the B form of DNA is a 36° coil; thus the base pairs in our models are coiled 10°). This degree of uncoiling is consistent with the unwinding angle attributed to some intercalating agents (Miller, K. J. in *Biomolecular Stereodynamics* II, 1981, R. H. Sarma, ed., Adenine Press, New York, page 469). The amount of separation of the base pair profiles was approximately 6 angstroms. Positive images of the cavity were constructed with "Oasis" which was contoured to the surfaces of the base pairs. The "Oasis" images were sliced down the center parallel to the base pairs; each of the central slices is unique. The positive "Oasis" images were then dipped in wax for reinforcement and used as molds to make the cavities with RTV silastic polymer. The ten cavities are formed from the following base pairs: AT/TA, TA/AT, TA/TA, CG/CG, CG/TA, AT/CG, GC/CG, TA/GC, TA/CG and CG/GC.

The helix axis, a consistent reference point in the DNA structure was used to examine the stereochemical relationships of a base in any sequence. The unique symmetrical arrangement of bases in relationship to the helix axis of B-DNA made this feasible.

B. Utility of the Cavities Formed by Unwinding DNA

If a given cavity is constructed and the complimentary fit of a natural or synthetic ("parent") compound has been established, the cavity can then be used to establish the fits of other molecules. Given the structure of a compound, the potential linkages (i.e., hydrogen bonding) of hydrophilic groups to the backbone of the DNA as well as hydrogen bonding points between base pairs on the upper and lower surfaces of the cavity can be evaluated; the ability of its shape to be accommodated within the cavity can also be determined. If the molecule has similar hydrogen bonding points to the "parent" compound and fits into the cavity, it will very likely have the same biological activity. For example, the synthetic estrogen diethylstilbestrol fits into the same cavity as the potent natural estrogen estradiol, and possesses a conformation (in the cavity) in which the two hydroxyl groups can hydrogen bond to phosphate oxygens on the DNA as is the case with estradiol. Steroid molecules, which fill the cavity and form hydrogen bonds analogous to those formed by estradiol but also have portions which extend out the cavity, would be ideal candidates for antagonists. The antiestrogens tamoxifen and nafoxidine are examples.

A candidate molecule must: (1) fit into a cavity between DNA base pairs without distorting the helix backbone or disrupting the complementarity of the Watson and Crick base pairs; and (2) be capable of forming stereospecific hydrogen bonds between each of the heteroatoms in the molecule and potential hydrogen bonding points in the cavity without distorting the cavity.

Examples of estrogens and other biologically active steroid antagonists which fit into one of the ten cavities are summarized below; related molecules which do not fit and have little or not activity are also listed.

| Fit Cavities: Biologically Active | Do Not Fit Cavities: Not Known To Be Biologically Active |
|---|---|
| estradiol | unnatural enantiomer of estradiol |
| progesterone | unnatural enantiomer of progesterone |
| testosterone | |
| trans-diethylstilbesterol | |
| estrone | 17-α-estradiol |
| estriol (16-hydroxyestradiol) | 2-hydroxyestrone |
| 2-hydroxyestradiol | 16-α-hydroxyestradiol |
| lanosterol | 17-methoxymestranol |
| cholesterol | 3-methoxyestradiol |
| 5-pregnenolone | d, 1-hexestrol |
| dehydroepiandrosterone | |
| 4-androstenedione | |
| cortisol | |
| cortisone | |
| deoxycortisol | |
| ethynylestradiol | |
| retroprogesterone | |
| synthetic progestin | |
| corticosterone | |
| aldosterone | |

-continued

| Fit Cavities: Biologically Active | Do Not Fit Cavities: Not Known To Be Biologically Active |
|---|---|
| meso-hexestrol | |
| prostaglandins | |
| benzapyrene oxide | |
| diethylstilbestrol | |
| thalidomide | |
| sucrose | |
| vitamin A | |
| thyroxine and its metabolites and agonists | |
| abcisic acid | |
| gibberellic acid | |
| mineral carticoids | |

The degree of biological activity of compounds can also be determined by simply taking a series of compounds (natural or synthetic), fitting them into the cavities and ranking them according to their fit and complementary hydrogen bonding. Those compounds that fit best have the highest degree of activity than those that fit poorly.

Several tests of the new cavities have been performed. For example, proflavine fits into only one cavity. The fit which is derived from the same sequence which is known experimentally to selectively bind proflavine (Miller, reference above). Also, the correlation of cavity fit and hydrogen bonding to biological activity has been demonstrated with natural and synthetic molecules which are like estradiol.

The fits of several groups of compounds have been tested in the cavities including: estrogen and related agonists and antagonists; testosterone; progesterone; cortisone; cortisol; mineral corticoids; gibberellic acid; abcisic acid; vitamin A; thyroxine and its metabolites and agonists; prostaglandins; benzapyrene oxide; diethylstilbestrol; thalidomide; sucrose. In each case, the fit into a given cavity appears to be specific; the correlation of biological activity with fit, including degree of fit with degree of biological activity, appears to be nearly perfect. Unusual structures whose correlation of structure with biological activity has remained enigmatic appear to follow the model. For example, the relative biological activity of a series of curious estrone analogs [R. B. Gabbard, L. F. Hamer and A. Segaloff, *Steroids*, vol. 37, pages 243-253 (1981)] correlates with fit into DNA in the cavity T-A/G-C. (Thymine-Adenine/Guanine-Cytosine).

What we claim is:

1. A method for determining the biological activity of a molecule, comprising the steps of:

(a) preparing a model of a complementary double-stranded codon-anticodon nucleic acid complex;

(b) removing the second base of the triplet sections of said codon to form in each section a space bordered by the remaining bases;

(c) connecting the closest points on the upper and lower surfaces of the bases bordering the space to form a cavity; and (d) comparing the stereochemical properties of said molecule with each of the cavities to determine a complementary fit, with a fit indicating said biological activity.

2. A method of predicting the biological activity of a molecule by the use of a representation of a nucleic acid, comprising the steps of:

(a) removing the middle base in a codon of a nucleotide triplet of said nucleic acid;

(b) analyzing the physiochemical fit of said molecule and said cavity to determine whether said fit is complementary;

(c) repeating steps (a) and (b) above for a different codon if said fit is not complementary; and (d) if said fit is complementary, comparing the biological activity of a compound known to fit within said cavity with said molecule to predict the biological activity of said molecule.

3. A method as claimed in claim 2 wherein said nucleic acid is B-DNA.

4. A method of designing a biologically active molecule utilizing a representation of DNA, comprising the steps of:

(a) formulating a model of a proposed molecule;

(b) forming the topology of a cavity created by the removal of the second base of a triplet section of the codon in said representation of DNA;

(c) inserting into said cavity said model of said molecule;

(d) analyzing the physiochemical fit of said molecule within said cavity to determine if said fit is complementary;

(e) repeating steps (b)-(d) above for a successive number of cavities formed from the removal of the second base of a triplet section of the codon in said representation of DNA until a complementary physiochemical fit of said molecule is obtained within a cavity; and (f) comparing the biological activity of a known compound that has a physiochemical fit within the cavity into which said molecule fits with said molecule to determine the amount of biological activity of said molecules.

5. A method as claimed in claim 4 wherein said analyzing step includes examining the degree of hydrogen bonding of said molecule within said cavity.

6. A method as claimed in claim 4 and further including the step of (g) manipulating the design of said molecule and repeating steps (b)-(d) until the requisite level of biological activity is obtained.

7. A method of predicting the biological activity of a molecule by the use of a representation of a cavity in nucleic acid comprising the steps of:

(a) preparing a model of double-stranded nucleic acid;

(b) unwinding the nucleic acid model strands to a predetermined degree to form a space;

(c) connecting the closest points on the upper and lower surfaces of the bases bordering the space to form a cavity;

(d) comparing the stereochemical properties of said molecule with each of the cavities to determine a complementary fit, with a fit indicating said biological activity.

8. A method as claimed in claim 7 wherein said unwinding step includes the step of uncoiling said strands about the helix axis 26°.

* * * * *